(12) United States Patent
Gopalkrishna

(10) Patent No.: US 7,103,242 B2
(45) Date of Patent: Sep. 5, 2006

(54) PHOTONIC SWITCH WITH BACTERIAL PROTEIN

(75) Inventor: Hegde M. Gopalkrishna, Singapore (SG)

(73) Assignee: Ngee Ann Polytechnic, Singapore (SG)

( * ) Notice: Subject to any disclaimer, the term of this patent is extended or adjusted under 35 U.S.C. 154(b) by 0 days.

(21) Appl. No.: 11/068,697

(22) Filed: Mar. 1, 2005

(65) Prior Publication Data

US 2005/0200932 A1    Sep. 15, 2005

Related U.S. Application Data

(60) Provisional application No. 60/551,719, filed on Mar. 10, 2004.

(51) Int. Cl.
*G02B 6/26* (2006.01)

(52) U.S. Cl. .......................... 385/16; 385/15; 385/14; 385/129; 385/130; 385/131

(58) Field of Classification Search ................ 385/12, 385/129, 130, 131, 14, 15, 16, 17, 18, 24
See application file for complete search history.

(56) References Cited

U.S. PATENT DOCUMENTS

| | | | | |
|---|---|---|---|---|
| 5,279,932 | A * | 1/1994 | Miyasaka et al. | 430/495.1 |
| 5,618,654 | A * | 4/1997 | Takei et al. | 430/347 |
| 5,757,525 | A * | 5/1998 | Rao et al. | 359/108 |
| 2003/0152358 | A1* | 8/2003 | Ormos et al. | 385/145 |

* cited by examiner

*Primary Examiner*—Brian M. Healy
(74) *Attorney, Agent, or Firm*—Baker Botts LLP

(57) ABSTRACT

A photonic switch for switching an incoming light beam from a first path to a second path, the photonic switch comprising a light sensitive material with a refractive index able to be changed by an induced light.

19 Claims, 3 Drawing Sheets

PHOTONIC SWITCH WITH BACTERIAL PROTEIN

RELATED APPLICATIONS

The present application claims priority benefit from US Provisional Patent Application 60/551,719 entitled "Photonic Switch with Bacterial Protein" filed on Mar. 10, 2004 the contents of which are hereby incorporated by reference.

FIELD OF THE INVENTION

This invention relates to a photonic switch with bacterial protein and refers more particularly, though not exclusively, to a bacterial protein-based programmable photonic switch for integrated optics applications.

BACKGROUND TO THE INVENTION

There are many different optical switches presently proposed. The attractions of using all-optical switches are significant. All-optical switches steer light pulses among different fiber spans without converting them into electrical signals. They promise to relieve potential capacity bottlenecks, reduce costs, and make it easier for operators of telecommunications system to deploy future developments in transmission technology.

But reaping these rewards means taking some big risks. In particular, the switching fabric that will form the basis of most all-optical switches is at an early stage of development. They include arrays of tiny tilting mirrors, liquid crystals, bubbles, holograms, and thermo and acousto-optics. At present, however, none of them are close to being ready for widespread deployment in carrier networks.

MEMS (microelectro-mechanical systems) based switches use minuscule mechanisms sculpted from semiconductor materials such as silicon. They're already in widespread use in other industries and are starting to be used in components for telecommunications equipment.

In the field of optical switches, MEMS switches are used in a variety of ways. These include arrays of tiny tilting mirrors, which are either two-dimensional ("2D") or three-dimensional ("3D").

In a typical 2D array, the mirrors simply flap up and down in the optical equivalent of a crossbar switch. When they're down, light beams pass straight over them. When they're up, they deflect the beam to a different output port. 3D subsystems can support thousands of ports in theory, but this hasn't been proven in practice. Their switching speed is relatively slow. It is under 10 milliseconds for 4×4 and 8×8 switches. But the switching time increases to 20 ms for the larger 16×16 devices.

The presence of moving parts raises questions about mechanisms sticking, wearing out, or being damaged by vibration. Losses increase substantially if multiple subsystems have to be linked together.

With holography-based switches, an electrically energised Bragg grating (a series of stripes of different refractive index materials, each of which reflects a specific wavelength of light) is created in the form of a hologram inside a crystal. When voltage is applied, the Bragg grating deflects the light to the output port. With no voltage, the light passes straight through. Each input fiber requires a row of crystals, one for each wavelength on the fiber. Such switches have high scalability and are suitable for switches with many thousands of ports; have very fast switching speeds; and can switch from one wavelength to another in a few nanoseconds. They are potentially reliable as they have no moving parts; have low losses, and have good port-to-port repeatability as there is no path dependency within the switch.

However, high voltages are required, placing demands on the electronic supply equipment. Also, they can't compete with MEMS switches when handling groups of wavelengths being switched together from one fiber to another.

Thermo-optical technology is used for making small optical switches—typically in the 1×1, 1×2, and 2×2 range. It's a planar technology, so larger switches can be formed by integrating basic 1×2 components on the same wafer.

There are two basic types of thermo-optic switch: a digital optical switch (DOS) and interferometric switches. Interferometric switches have the advantage of being more compact, but are wavelength sensitive. For this reason they usually require some form of temperature control.

Size is limited not by optical losses, but by the power consumed in switching. Therefore, scalability is high. But the switching speed depends on how fast it is possible to heat the material. Polymer switches typically achieve a switching speed of a few milliseconds. Silica is usually slower, at around 6 to 8 ms. As there are no moving parts they are potentially reliable. However, repeated heating and cooling may limit the life of switches. Silica has very low losses, but polymer losses are higher.

Port-to-port repeatability in good, and polymer-based switches require very low switching power, typically 5 milliwatts. Silica switches consume about 100 times more power.

The progress in the development of optical computers is severely hindered due to the lack of appropriate materials to design the fast responding photonic switches, which can be operated with the help of light beams. The field of biomolecular electronics is currently focusing on finding the remedy to this problem through the adoption of suitable biological materials for this purpose.

SUMMARY OF THE INVENTION

In accordance with a preferred aspect there is provided a photonic switch for switching an incoming light beam from a first path to a second path. The photonic switch comprises a light sensitive material having a refractive index able to be changed by an induced light. The light sensitive material may be a biological material, such as a film of bacteriorhodopsin.

In a second preferred aspect there is provided a photonic switch for switching an incoming light beam from a first path to a second path. The photonic switch comprises a film of bacteriorhodopsin. The film may have a refractive index able to be changed by an induced light. The induced light may be of a predetermined visible wavelength.

For both aspects, the film may be located within the photonic switch at a junction of the first path and the second path.

The induced light may be a pulsed laser beam. The pulsed laser beam may have a variable pulse width and a variable repetition rate. The variable pulse width and variable repetition rate may be controlled by use of a controlled band pass filter. The controlled band pass filter may be computer controlled.

The pulsed laser beam may be producable by a gain-switched, pulsed, semiconductor laser. The pulsed laser beam may have a wavelength in the range 514 nm to 640 nm. The pulsed laser beam may be selected from the group consisting of: yellow light at 530 nm, and red light at 640 nm.

The bacteriorhodopsin may be chemically enhanced; and the film may be at an interface angle with the incoming light beam, the interface angle being in the range 45° to 75°.

BRIEF DESCRIPTION OF THE DRAWINGS

In order that the invention may be fully understood and readily put into practical effect, there shall now be described by way of non-limitative example only a preferred embodiment of the present invention, the description being with reference to the accompanying illustrative drawings in which.

In the drawings.

DETAILED DESCRIPTION OF PREFERRED EMBODIMENT

The biological material bacteriorhodopsin ("BR") is a bacterial protein found in the purple film of Halobacterium halobium. It has recently emerged as a light sensitive material with all the necessary characteristics to be a good photonic material. The advantages of BR molecules include high quantum efficiency of converting light into a state change, large absorption cross section and optical nonlinearities, robustness to degeneration by environmental perturbations, ability to form thin films in polymers and gels, and the existence of genetic variants with enhanced spectral properties for specific device applications. These photochromic properties of BR molecules have resulted in applications such as, for example, pattern recognition systems, three-dimensional memories, holography, second harmonic generation, mode locking, spatial light modulation, and logic gates.

Figure 1:
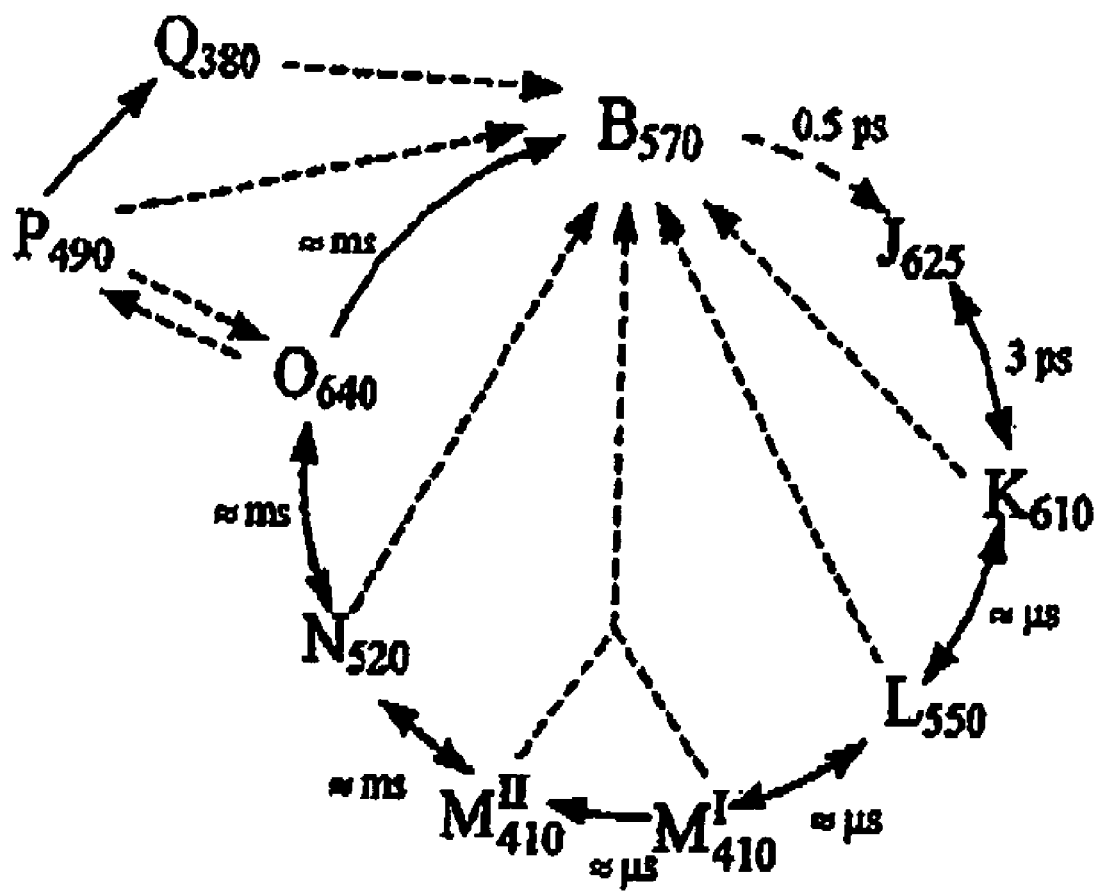
FIG. 1 is a schematic representation of the photochemical cycle of a bacteriorhodopsin molecule.

When exposed to light of a predetermined visible wavelength, the BR molecule undergoes a complex photocycle having many intermediate states with absorption maxima spanning the entire visible region of the spectrum, as shown in FIG. 1. FIG. 1 is a result of being exposed to 570 nm laser light and indicates various intermediate states. In the initial B state, also called the light adapted state, the retinal chromophore is in its all-trans molecular configuration. After excitation with yellow light at 570 nm, the molecule in the initial B state is transformed into the J state with an absorption maximum at ~650 nm within about 450 fs time. The species in the J state thermally transforms in 3 ps into the intermediate K state, which in turn transforms in 2 µs into the L state. The relatively long-lived intermediate M state is generated by thermal relaxation of species from the L state in 50 ms. The molecule returns to the B state via a couple of intermediate states N and O through thermal relaxation in about 10 ms. From the all-trans configuration of O, the P state is formed in a photochemical transition induced with red light (640 nm). In the dark, a thermal decomposition of the P state to the initial B state and the initial B state can be regenerated only through photochemical excitation of the P and Q states. An important feature of all the intermediates is their ability to be photochemically switched back to the initial B state by shining light at a wavelength that corresponds to the absorption peak of the intermediate state in question.

By using the fact that the refractive index of BR medium changes upon exposing to the light of wavelengths falling within its photocycle described above, it is possible to create a switch. The refractive index change in BR is intensity dependent. the optical power required for such a change in refractive index in BR is few mW/cm$^2$.

Figure 2:
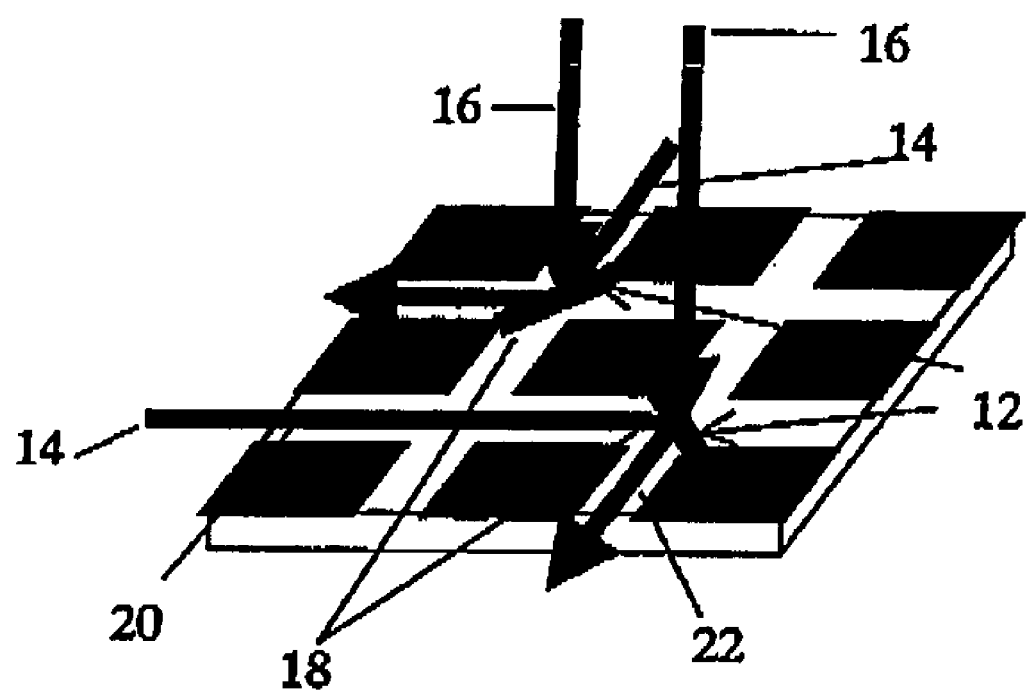
FIG. 2 is a schematic illustration of a proposed waveguide structure integrated with bacteriorhodopsin films.

The basic principle of the switch is shown in the schematic form in FIG. 2. The device consists of a conventional optical waveguide 10 which allows light beams to travel in the specified directions only. Alternatively, the waveguide 10 may be a hollow waveguide. The switch 12 has the ability to turn the incoming signal beams 14 in the desired direction by applying a modulation light beam 16. This is achieved by embedding a film of 12 BR film in the waveguide structure 10 at the point 18 where the turning of the beam is required. When the BR film 12 is illuminated with 514 nm light 16, the induced refractive index change in BR film 12 will change the direction of the incoming signal beam 14 at 633 nm travelling along the incoming or first path 20 of the waveguide 10 to a second path 22, thereby realizing two dimensional switching.

Thus, if a pulsed laser beam is used as an index modulating light source 16, it is possible to control the switching speed of the BR 12 depending on the pulsewidth and the repetition rate of the modulating laser beam 16. This allows an optical switching device to be able to operate at a high speed, with low power consumption; as well as all-optical switching.

The amount of refractive index change in the BR film 12 required for turning the input signal beam is estimated from the following analysis:

Let $n_1$ be the refractive index of the waveguide 10 medium and $n_2$ be that of the BR film 12 after exposure to the modulation beam 16. Using the condition of total internal reflection, the angle at which the BR film 12 is to be deposited to direct the guided light into the desired locations of the device 10 can be estimated. It is given by the relation $\sin\theta = n_2/n_1$, where $\theta$ is the turning angle. Assuming that $n_1 \approx 1.5$, in order to create an interface at 45° to the input beam (beam 1), the required change in refractive index ($\Delta n_2$) in the BR material is estimated to be 0.43933. Such a large change in refractive index is unlikely to be achieved. In such a situation a suitable combination of the light induced refractive index change and the corresponding angle of incidence can be used to realize the proposed switching (based on the Brewester angle). However, chemically enhanced BR has exhibited a light induced refractive index change of the order of $10^{-3}$ in the waveguide.

Chemical enhancing may be performed to tailor the properties of BR for different applications. Each BR molecule consists of 248 amino acids arranged in seven transmembrane (symbol alpha) helices Chemical modification is, for example, by high pH, dehydration, and the addition of aminocompounds. If it is chemically modified so to achieve larger change in refractive index, the angle can be further reduced to, for example, 45 degrees.

Taking a light induced index change of about $5 \times 10^{-2}$, the estimated angle of BR film interface for the incoming beam 14 is about 75°. This may be a large angle of incidence for switching. A suitably modified BR structure so as to achieve an index change of the order of $10^{-1}$ would assist the optical switching device. Thus, it is possible to provide a low-loss and high-contrast optical switching device using a biomaterial, which can respond at a high speed.

Figure 3:
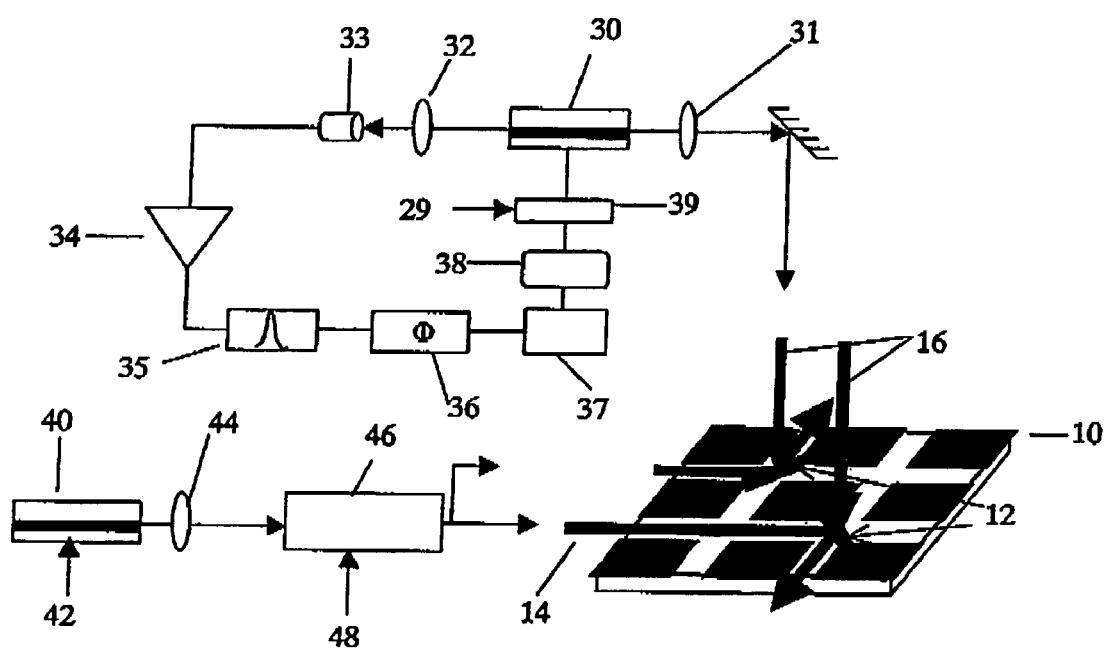
FIG. 3 is a schematic illustration of a programmable bacteriorhodopsin based photonic switching in optical waveguides.

The proposed switch can be made to operate at the required switching rate by using ultrashort light pulses from a mode-locked or gain-switched semiconductor laser. The schematic diagram of the BR-based photonic switch with programmable switching control system is shown in FIG. 3. In this scheme the index modulation beam is a continuous train of light pulses of required pulsewidth (~ps) and repetition rate. The pulses are generated by regenerative gain switching the diode laser 30 and lens 31. A second lens 32, detector 33, pre-amplifier 34, programmable band pass filter 35, phase shifter 36, power amplifier 37, non-linear pulse shaper 38, bias tee 39 and DC current 29 are used, in accordance with known technology. The advantage of this method is that the pulse repetition rate can be varied using the controlled band pass filter 35. The switching rate can be varied by use of a computer (not shown). The data to be transmitted is launched into the waveguide by the conventional technique of using a laser diode 40, a DC current 42, lens 33, encoder 46, and data stream 48.

The incorporation of protein switch based routing has several distinct advantages including compactness, speed, an optically controlled switching speed, improvements in switch isolation, and wavelength selection.

The programmable high-speed photonic switch has many applications. Predominantly it can be used for the rerouting of optical channels in fiber optic communications. This family of devices provides an optical switching and routing system that is useful for interconnecting any of an input array's optical channels to any of an output array's optical channels utilizing an optically controlled switching speed. Also they can be used in optical interconnects to store and retrieve data in a computer.

The switch is integrated with matured technology of optical waveguides, and may replace other forms of optical waveguides such as, for example, photonic crystals. The system utilizes light induced refractive index change in the biological material for its switching action. The switch has an added feature of programmability where the required switching speed could be selected through appropriate software.

Whilst there has been described in the foregoing description a preferred embodiment of the present invention, it will be understood by those skilled in the technology concerned that many variations or modifications in details of design, construction or operation may be made without departing from the present invention.

The invention claimed is:

1. A photonic switch for switching an incoming light beam from a first path to a second path, the photonic switch comprising a light sensitive material with a refractive index able to be changed by a pulsed laser beam having a variable pulse width and a variable repetition rate, wherein the variable pulse width and variable repetition rate are controlled by use of a controlled band pass filter.

2. A photonic switch as claimed in claim 1, wherein the light sensitive material is a biological material.

3. A photonic switch as claimed in claim 2, wherein the biological material is a film of bacteriorhodopsin.

4. A photonic switch for switching an incoming light beam from a first path to a second path, the photonic switch comprising a film of bacteriorhodopsin.

5. A photonic switch as claimed in claim 4, wherein the film has a refractive index able to be changed by a pulsed laser beam having a variable pulse width and a variable repetition rate, wherein the variable pulse width and variable repetition rate are controlled by use of a controlled band pass filter.

6. A photonic switch as claimed in claim 1, wherein the induced light is of a predetermined visible wavelength.

7. A photonic switch as claimed in claim 5, wherein the induced light is of a predetermined visible wavelength.

8. A photonic switch as claimed in claim 3, wherein the film is located within the photonic switch at a junction of the first path and the second path.

9. A photonic switch as claimed in claim 4, wherein the film is located within the photonic switch at a junction of the first path and the second path.

10. A photonic switch as claimed in claim 1, wherein the controlled band pass filter is computer controlled.

11. A photonic switch as claimed in claim 1, wherein the controlled band pass filter is computer controlled.

12. A photonic switch as claimed in claim 1, wherein the pulsed laser beam is producable by a gain-switched, pulsed, semiconductor laser, the pulsed laser beam having a wavelength in the range 530 nm to 640 nm.

13. A photonic switch as claimed in claim 1, wherein the pulsed laser beam is producable by a gain-switched, pulsed, semiconductor laser, the pulsed laser beam having a wavelength in the range 530 nm to 640 nm.

14. A photonic switch as claimed in claim 1, wherein the pulsed laser beam is selected from the group consisting of: yellow light at 532 nm, and red light at 640 nm.

15. A photonic switch as claimed in claim 1, wherein the pulsed laser beam is selected from the group consisting of: yellow light at 532 nm, and red light at 640 nm.

16. A photonic switch as claimed in claim 3, wherein the bacteriorhodopsin is chemically enhanced to modify the refractive index.

17. A photonic switch as claimed in claim 4, wherein the bacteriorhodopsin is chemically enhanced to modify the refractive index.

18. A photonic switch as claimed in claim 8, wherein the film is at an interface angle with the incoming light beam, the interface angle being in the range 45° to 75°.

19. A photonic switch as claimed in claim 1, wherein the film is at an interface angle with the incoming light beam, the interface angle being in the range 45° to 75°.

* * * * *